(12) United States Patent
Suponau et al.

(10) Patent No.: US 7,509,477 B2
(45) Date of Patent: Mar. 24, 2009

(54) AGGREGATING DATA FROM DIFFERENCE SOURCES

(75) Inventors: Dzmitry Suponau, Bellevue, WA (US); Jay Girotto, Kirkland, WA (US); Qiang Wu, Sammamish, WA (US); Rohit Vishwas Wad, Redmond, WA (US); Yue Liu, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 344 days.

(21) Appl. No.: 11/401,887

(22) Filed: Apr. 12, 2006

(65) Prior Publication Data
US 2007/0245118 A1    Oct. 18, 2007

(51) Int. Cl.
*G06F 12/00* (2006.01)
(52) U.S. Cl. ............................. 711/216; 711/220; 707/1
(58) Field of Classification Search ................. 711/216, 711/220; 707/1
See application file for complete search history.

(56) References Cited

U.S. PATENT DOCUMENTS

| 6,094,649 | A  | * | 7/2000  | Bowen et al. ................... 707/3 |
| 6,547,829 | B1 | * | 4/2003  | Meyerzon et al. ............ 715/234 |
| 6,658,626 | B1 | * | 12/2003 | Aiken .......................... 715/205 |

* cited by examiner

*Primary Examiner*—Reba I Elmore
(74) *Attorney, Agent, or Firm*—Shook, Hardy & Bacon L.L.P.

(57) ABSTRACT

A method and system that aggregates data associated with one or more entities from different data sources are provided. The data sources include documents, web pages, or images that have information about one or more entities. The information is extracted from the data sources based on criteria that define the entities. The extracted information is utilized to generate a hash identifier that corresponds to each entity and one or more storage locations. The one or more storage locations and associated hash identifiers are utilized to store the extracted information corresponding to the entities, and the extracted information for each entity is structured as a virtual page that is stored in an index having references to the data sources.

19 Claims, 5 Drawing Sheets

AGGREGATING DATA FROM DIFFERENCE SOURCES

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Conventionally, a web page is processed and stored in a search index that responds to user queries having one or more terms associated with the web page. The search index stores terms and references to documents having the terms. Thus, when a user query having the term "cats" is issued to a search engine, the search engine returns all indexed documents having the term. The index is searched to provide all documents having the term "cats."

Conventional search indices store terms and references to documents having the terms. The search indices do not provide access to aggregated information associated with terms that correspond to separate entities because the separate entities are not documents. So, search engine operations, such as, querying, ranking, or content description generation, may not be performed on the separate entities. Additionally, the conventional search indices do not provide aggregated views of the separate entities. For instance, conventional search indices may return all papers written by an author specified in a query, but the conventional search indices do not provide information related to the author, such as the author's home address, university, or Uniform Resource Locator (URL).

SUMMARY

Embodiments of the invention provide a method to aggregate data associated with one or more entities. An index is generated to store references to data sources and virtual pages. The virtual pages structure aggregated data for each entity included in the data sources. The entities may be defined by criteria that specify data to extract from the data sources. The data extracted from the data sources is utilized to generate hash identifiers. The hash identifiers are associated with one or more storage locations that store the extracted data. The extracted data from each data source having data associated with the entity is stored in the storage location corresponding to a hash identifier corresponding to the entity. Accordingly, the extracted data for each entity may be aggregated and structured in a virtual page that may be referenced by the index.

In another embodiment, a system to generate virtual pages is provided. The system includes documents, crawlers, indices and extracting, hashing and virtual page components. The documents are gathered by the crawlers and parsed by the extracting component to generate virtual pages that are stored in the indices. The hashing component utilizes information parsed from the documents to generate a hash identifier that corresponds to storage locations for data parsed by the extracting component. The virtual page component structures aggregated parsed data associated with one or more entities in virtual pages, and the indices provide access to the virtual pages and documents.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the invention extract data from documents and aggregate the data to generate virtual pages associated with one or more entities. The one or more entities are objects that represent information that are associated with a document. The entities may include books, authors, university, town or any similar object. The documents and virtual pages are stored in search indices that are utilized to respond to search queries. Search queries that specify terms associated with the virtual pages and documents are issued to search indices to obtain results that include the virtual pages and documents. In an embodiment, data is extracted from the documents based on criteria that define one or more entities. The extracted data may be utilized to generate hash identifiers. The hash identifiers are utilized to aggregate the extracted data associated with the one or more entities. The aggregated information is structured and stored in the search indices to provide access to data for the one or more entities.

Additionally, embodiments of the invention provide a system that presents the virtual pages associated with the one or more entities. The computer system may include one or more data sources, crawlers, extracting, hashing and virtual page components and search indices. The search indices provide access to the one or more data sources and virtual pages having aggregated data about one or more entities. The virtual pages are generated by utilizing the extracting component to extract data based on criteria that define one or more entities. The hashing component utilizes the extracted data to generate hash identifiers that are associated with the one or more entities. The virtual page component aggregates and structures the extracted data based on the hash identifiers to create virtual pages for the one or more entities. Accordingly, the search indices provide access to virtual pages and data sources associated with the virtual pages. In an embodiment of the invention, the system may be communicatively connected to client devices through a communication network, and the client devices may include a portable device, such as, laptops, personal digital assistants, smart phones, etc. The client devices may issue queries to the system, and the system may provide virtual pages and one or more data sources related to the queries.

As utilized throughout the disclosure, component refers to firmware, software, hardware, or any combination of the above.

Figure 1:
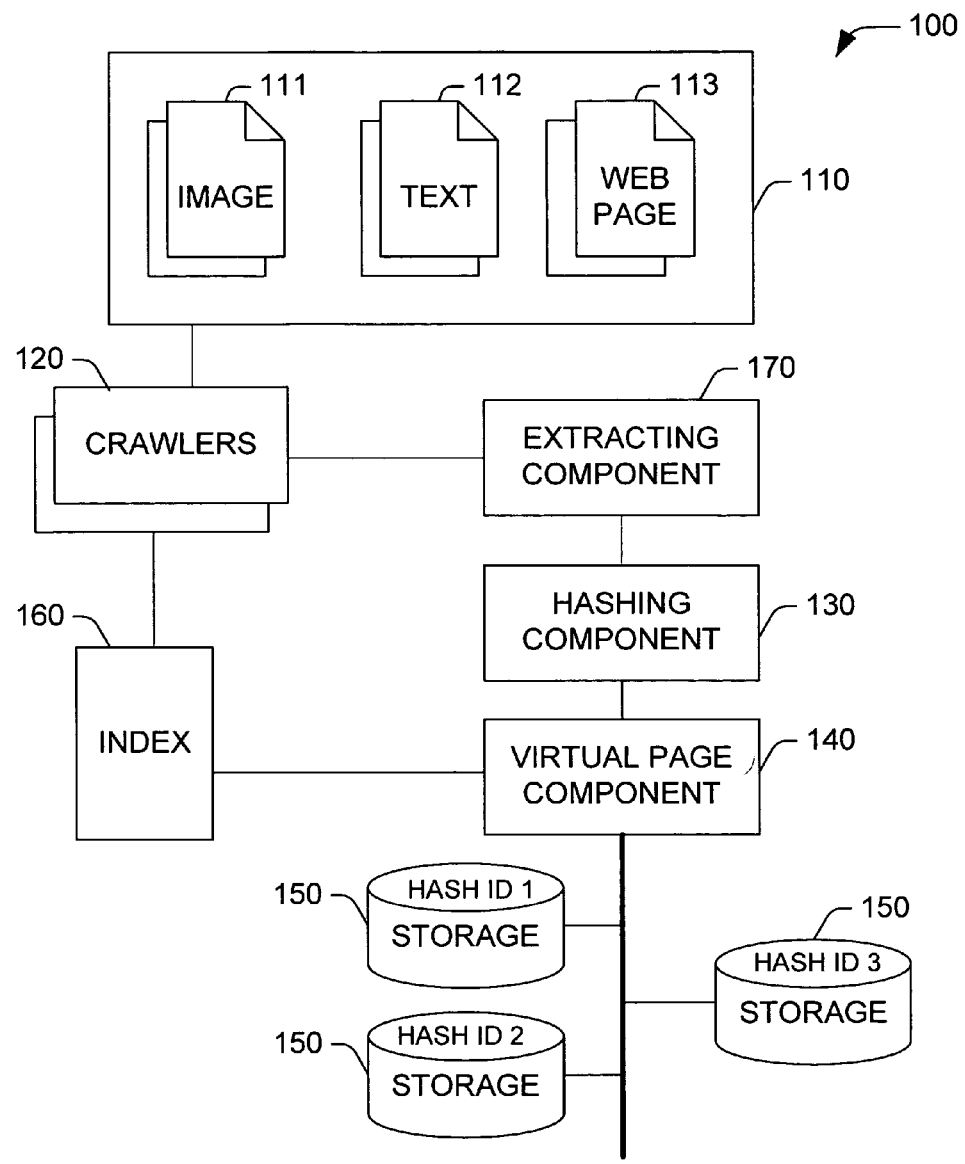
FIG. 1 is a block diagram that illustrates an exemplary computing environment, according to embodiments of the invention.

FIG. 1 is a block diagram that illustrates an exemplary computing environment 100, according to embodiments of the invention. The computing environment 100 is not intended to suggest any limitation as to scope or functionality. Embodiments of the invention are operable with numerous other special purpose computing environments or configurations. With reference to FIG. 1, the computing environment 100 includes a collection of data sources 110, where the data sources may include documents, such as image files 111, text files 112, web pages 113, etc. The computing environment 100 utilizes crawlers 120 and extracting hashing and virtual components 130, 140 and 170 to gather a collection of documents from the data sources 110 and to extract and aggregate data from the collection of documents. Moreover, the computing environment 100 may include an index 160 that provides access to the collection of data sources 110 and the aggregated extracted data.

The collection of data sources 110 may include, but is not limited to, image files 111, text files 112, and web pages 113. In an embodiment, the data sources 110 provide access to content that may include information about one or more entities. The collection of data sources 110 provides a corpus of documents that include information specifying varying levels of detail on different subject matters. For instance, some documents in the corpus of documents may be related to scientific subject matter, while others may be related to shopping or business subject matters. In an embodiment of the invention, when the data sources 110 are updated, the update may be propagated to one or more virtual pages associated with the data sources 110.

The crawlers 120 process the collection of data sources 110 to determine links to documents in the collection of data sources. Additionally, the crawlers 120 generate an index for the documents. In an embodiment of the invention, the crawler 120 communicates with the extracting component 170 to provide the extracting component 170 with documents that may be parsed.

The extracting component 170 processes the collection of data sources 110 to extract or parse information associated with one or more entities. In an embodiment, the entities are defined by an application owner, such as a developer or user. The entities are defined by a collection of criteria that specify data that should be extracted or parsed by the extracting component 170. Accordingly, the extracting component 170 utilizes the criteria associated with the one or more entities to extract data from the data sources 110. In an embodiment, the extracting component 170 utilizes the collection of criteria to parse documents received from the crawler 120.

The hashing component 130 utilizes the data extracted from the data sources 110 to generate a hash identifier. The hash identifier may represent a normalized value of a subset of the data extracted from the data sources 110. For instance, when criteria associated with an entity extracts data that includes title, first name, last name, publisher, and year, the hash identifier may be represented as a normalized value of the first name and last name. The normalized value may include the first initial of the first name concatenated with the last name. Thus, a subset of the extracted data is hashed to generate the hash identifier. The hashing component 130 utilizes the hash identifier to aggregate extracted data for entities associated with hash identifiers that uniquely represents each entity. In an embodiment, each hash identifier is associated with a storage location that is utilized to store all extracted data that corresponds to the hash identifier. The storage locations may include storage devices 150. In some embodiments, a hash identifier may be associated with two or more storage devices because the volume of extracted data requires additional storage locations. The hashing component 130 enables distributed aggregation of extracted data on different storage devices 150. Accordingly, for each data source 110, the extracted data associated with one or more entities is transmitted to corresponding storage devices 150 having hash identifiers associated with the one or more entities. The hashing component 130 utilizes one procedure for generating an identifier associated with an entity, where the identifier is content sensitive. One of ordinary skill in the art appreciates that alternative identifier generation procedures, such as random number generation, etc. may be utilized to generate an identifier for each entity. Accordingly, embodiments of the invention do not preclude other identifier generation procedures.

The virtual page component 140 aggregates the extracted data associated with each hash identifier and structures the extracted data in a markup language. The markup language may include, but is not limited to, HyperText Markup Language (HTML), extensible Markup Language (XML) or Wireless Markup Language (WML). The extracted data for each entity corresponding to a hash identifier is structured in the markup language to generate a virtual page for each entity. Accordingly, the virtual page component 140 produces structured pages having aggregated extracted data, and the structured pages are added to an index 160 having information about the data sources 110. In certain embodiments of the invention, the extracting, hashing and virtual page components may be incorporated into one or more separate components.

The index 160 includes references to or copies of the virtual pages and data sources 110. The index 160 may respond to search queries having terms that are related to the data sources 110 or virtual pages. In certain embodiments, the index 160 is an inverted index that provides access to the virtual pages and data sources. The index 160 provides an efficient data structure that responds to search queries that may be issued to a search engine.

Accordingly, the data sources are processed to extract data associated with one or more entities that correspond with hash identifiers and storage locations. The extracted data for each entity is utilized to generate hash identifiers that are associated with different storage locations. The hash identifiers uniquely represent each entity, and the extracted data is aggregated at the storage locations based on the hash identifiers. Virtual pages are generated from the extracted data stored at the storage locations and added to an index.

In an embodiment of the invention, entities are defined by a collection of criteria that is specified by an application owner. In some embodiment, the application owner may be a developer having familiarity with shopping, books or scientific subject matters. The collection of criteria may include properties related to the entities, and the extracting component may utilize the properties to extract data from a corpus of documents. In alternate embodiments of the invention, the collection of criteria for each entity may be pre-defined based on subject matter. For instance, book, shopping and business subject matters may define different criteria that should be extracted from the corpus of documents. For example, book subject matter, may include criteria, such as author, publisher or title, while shopping subject matter may include criteria, such as brand, price or store. The extracted values associated with the criteria are utilized to uniquely identify each entity. In certain embodiments, a subset of extracted values is hashed to generate a hash identifier that identifies each entity. The hash identifier is associated with one or more storage locations to store all extracted data associated with the entity, where the hash identifiers is utilized to route the extracted data to the corresponding storage location. Each entity may be associated with a virtual page that structures the data stored at the one or more storage locations.

Figure 2:
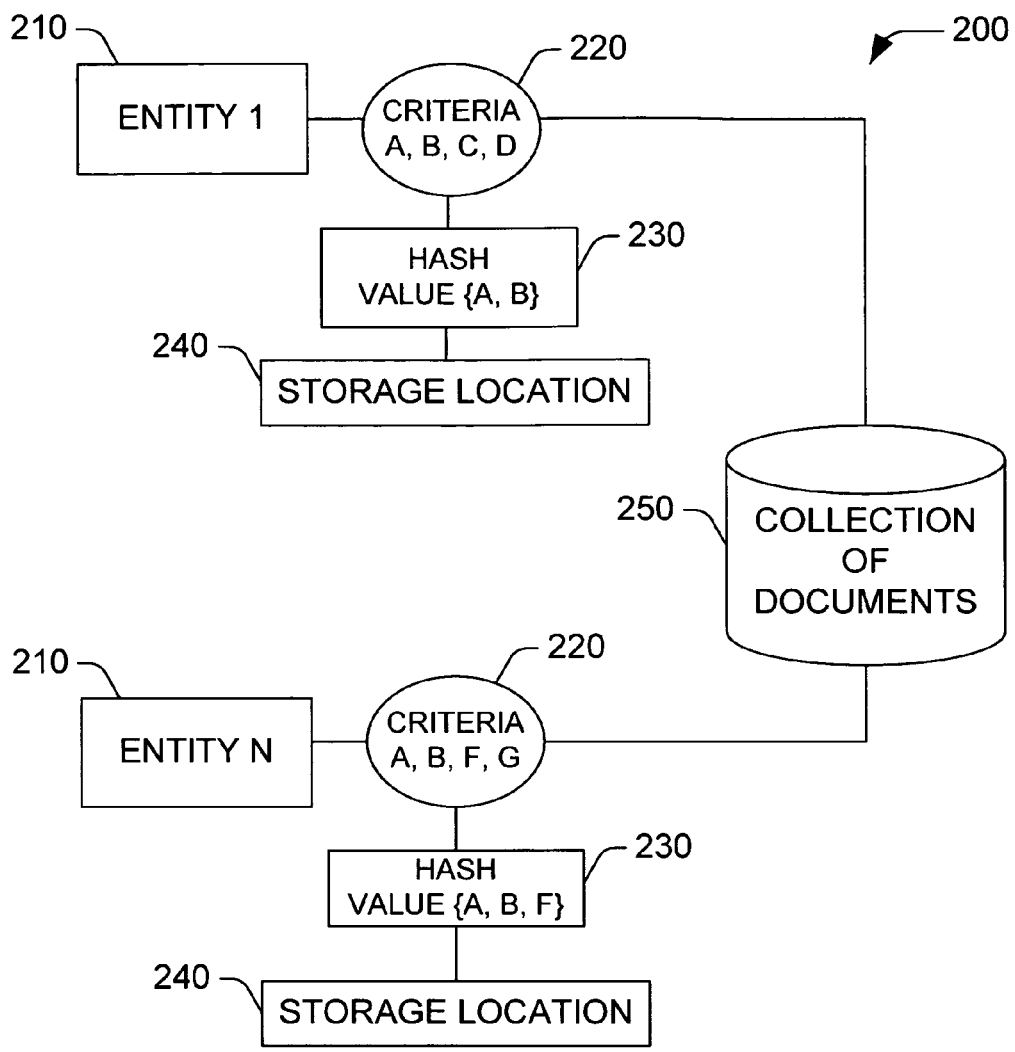
FIG. 2 is a block diagram that illustrates generating hash identifiers, according to embodiments of the invention.

FIG. 2 is a block diagram that illustrates generating hash identifiers, according to embodiments of the invention. The entities 210 are defined by the collection of criteria 220. Each entity 210 includes the collection of criteria 220, which defines the data that is extracted from the corpus of documents 250. The extracted data is utilized by hashing functions 230 to generate hash identifiers that are associated with one or more storage locations 240. A subset of the extracted data may be utilized by the hashing functions 230 to generate the hash identifiers. In certain embodiments, the hashing functions 230 may include Message Digest 5 (MD-5) and Secure Hash Algorithm 1 and 2 (SHA-1 and SHA-2). The storage locations 240 are utilized to aggregate extracted data associated with the entities 210 corresponding to the hash identifiers generated by the hashing functions 230. Accordingly, each entity is associated with one or more storage locations based on the corresponding hash identifier. In some embodiments, the hash identifier may be a URL, where all data associated with the URL are aggregated on the machine.

In certain embodiments, the data sources may include entity data that can be extracted and aggregated into a virtual page, which may be stored in an index. The data sources may include image content, text content or web page content. When the data sources include entity data that is related to the collection of criteria associated with the entity, the entity data is extracted from the data sources and placed in the storage location corresponding to the entity. In turn, the extracted entity data is aggregated and structured to produce a virtual page of the entity, and the virtual page is added to an index that is accessed when responding to user queries.

Figure 3:
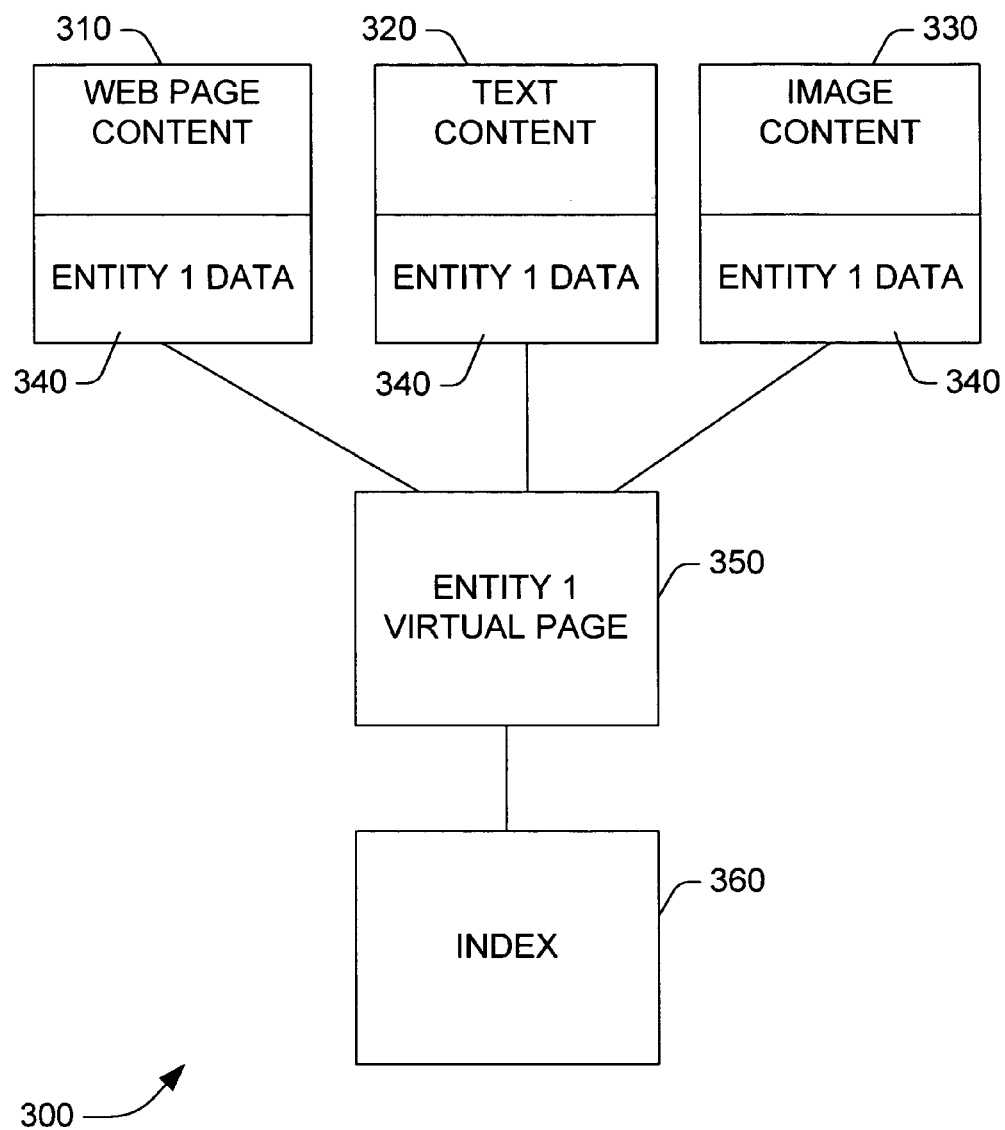
FIG. 3 is a content diagram that illustrates content associated with a virtual page, where the content is extracted from a corpus of documents, according to an embodiment of the invention.

FIG. 3 is a content diagram that illustrates content associated with a virtual page, where the content is extracted from a corpus of documents, according to an embodiment of the invention. The data sources 310, 320, and 330 may each include entity data 340. The data source 310 may include web page content and entity data 340, data source 320 may include text content and entity data 340 and data source 330 may include image content and entity data 340. The entity data 340 may be data associated with an entity and may include address information, URLs, ISBN numbers, product name, etc. In an embodiment, the data sources 310, 320, and 330 are distributed through out the Internet, and a crawler gathers data one the data sources and provides the data to an extracting component that extracts entity data 340 from the data sources 310, 320, and 330 based on criteria corresponding to the entity. The extracted entity data 340 is stored at one or more locations associated with the entity via hash identifiers. The stored entity data 340 is aggregated and structured to generate a virtual page 350 for the entity associated with the entity data. The virtual page is added to the index 360 to provide access to the virtual page 350.

Thus, embodiments of the invention generate virtual pages that provide aggregated data associated with one or more entities. The one or more entities are associated with criteria that define data that is extracted from data sources having data related to the entities. The extracted data is utilized to generate hash identifiers that are associated with one or more storage locations that store the extracted data. The stored data is aggregated and structured into virtual pages that are added to an index that responds search queries.

Figure 4:
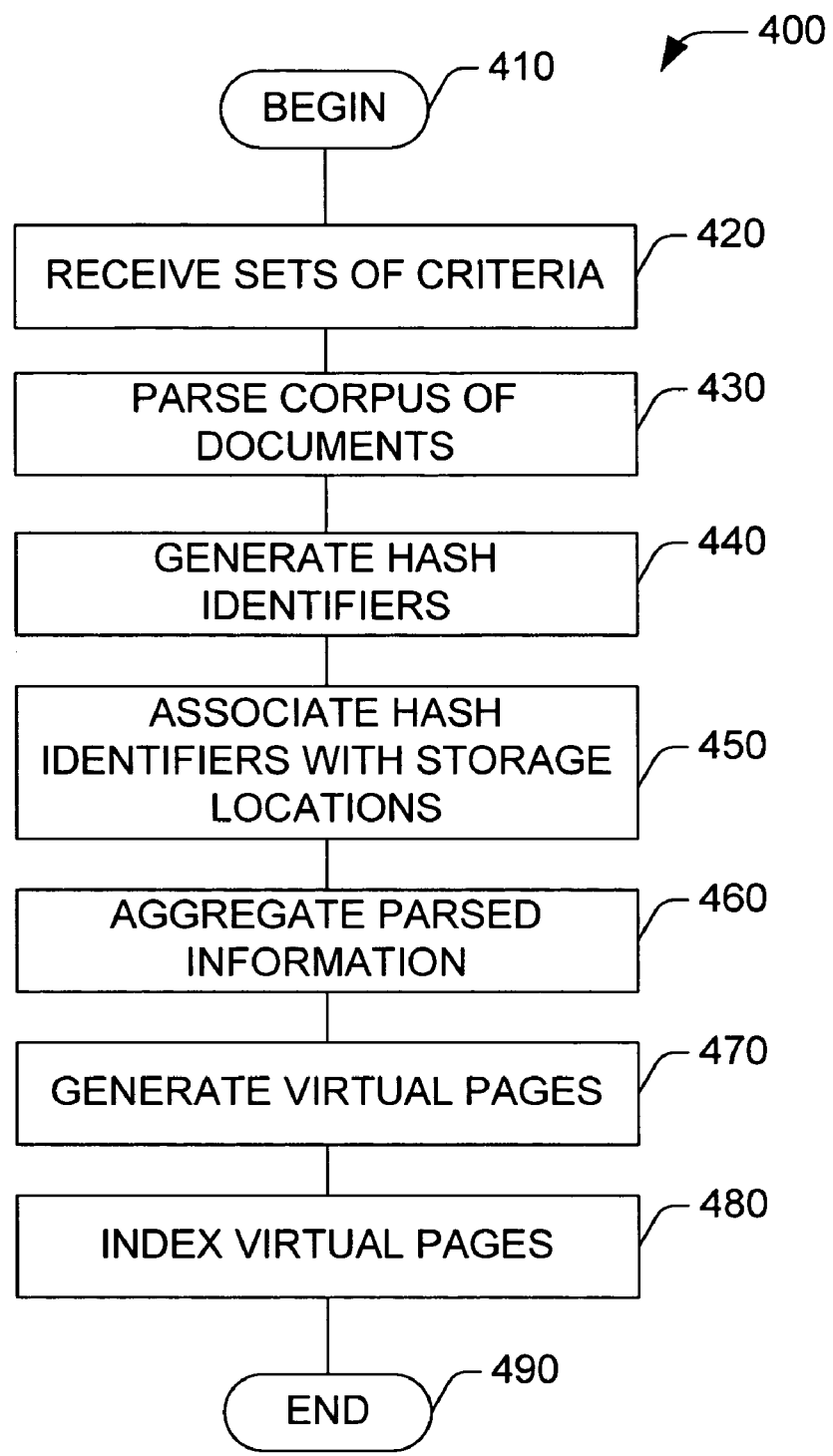
FIG. 4 is a logic diagram that illustrates a method to generate virtual pages, according to an embodiment of the invention.

FIG. 4 is a logic diagram that illustrates a method to generate virtual pages, according to an embodiment of the invention. The method begins in step 410 when generating an index. Sets of criteria related to one or more entities are received in step 420. The criteria are utilized to parse the documents in step 430. In step 440 hash identifiers are generated based on the criteria. In certain embodiments, a subset of the parsed data may be utilized when generating the hash identifiers. The hash identifiers are associated with one or more storage locations in step 450. In some embodiments, the storage locations may be separate storage devices. The parsed data is aggregated in the storage locations in step 460. The hash identifiers may route the parsed data to the appropriate storage locations when the parsed data is related to the hash identifier. In step 470 the stored data is utilized to generate virtual pages for each entity corresponding to a hash identifier. The virtual pages are added to the index in step 480. The method ends in step 490.

In an embodiment, the virtual pages are assigned ranks based on references associated with the virtual pages. The virtual pages may be linked to other virtual pages or other documents in the corpus of documents. The rank assigned to the virtual page may vary based on the number of references associated with the virtual page.

Additionally, embodiments of the invention aggregate data associated with an entity based on the hash identifier corresponding to the entity. Criteria that define the entity are utilized when generating an index for a corpus of documents and the virtual pages. The index may store a reference to each document or a copy of each document. The criteria are utilized to extract data from the documents, and the extracted data is utilized to generate the hash identifiers that are associated with one or more storage locations that store the extracted data.

Figure 5:
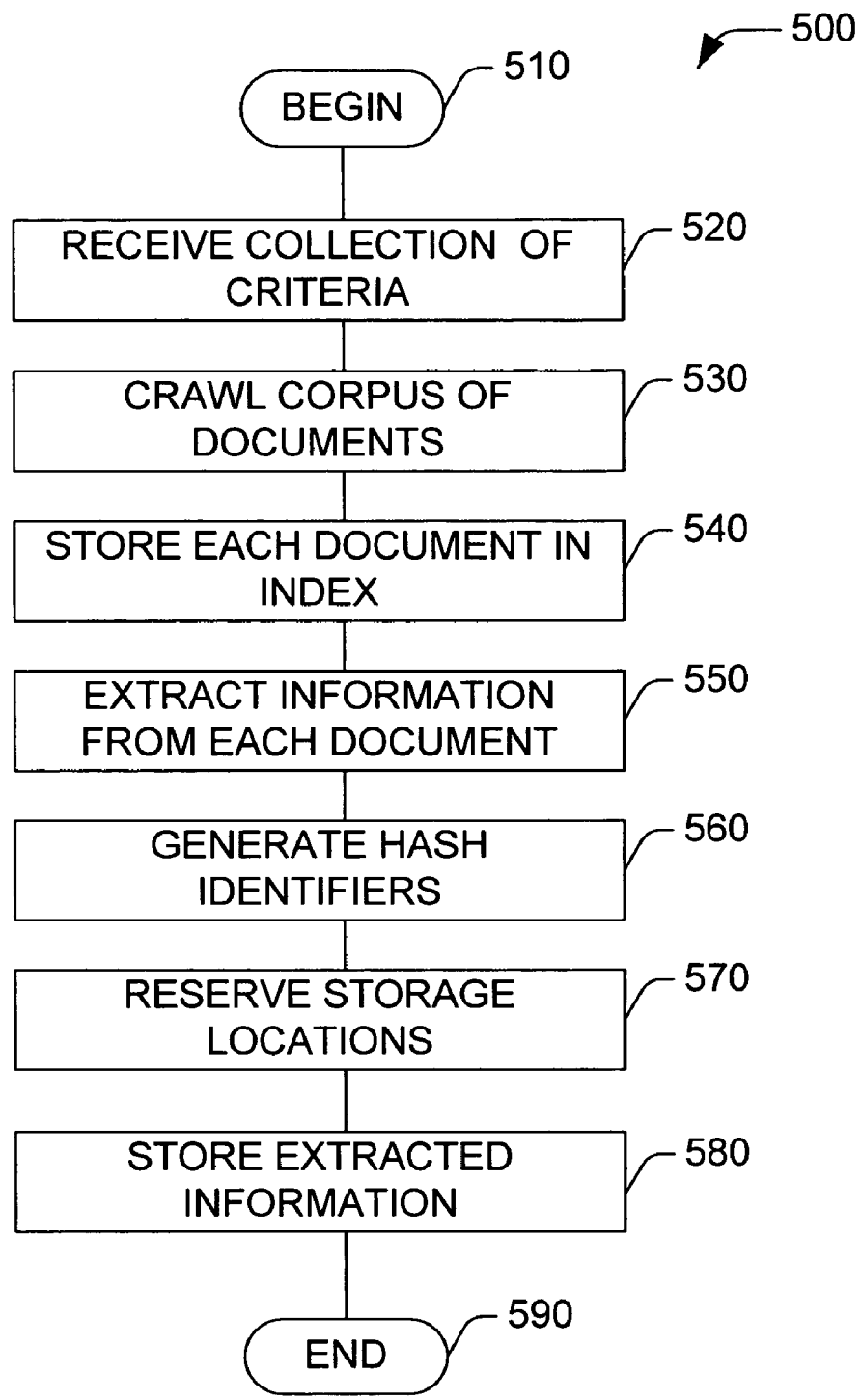
FIG. 5 is a logic diagram that illustrates a method to aggregate data from different sources, according to an embodiment of the invention.

FIG. 5 is a logic diagram that illustrates a method to aggregate data from different sources, according to an embodiment of the invention. The method begins in step 510 after a specified time interval has passed. The time interval may include a week, month or year and may be related to generating an index. The collections of criteria associated with one or more entities are received in step 520. A corpus of documents is crawled to select documents that may be indexed in step 530. In step 540 a reference to or a copy of each selected document is stored in the index. Each selected documents is processed to extract data based on the criteria in step 550. Hash identifiers are generated in step 560. The hash identifiers are related to information extracted from the selected documents and each hash identifier uniquely corresponds to an entity and may be associated with one or more storage locations. The one or more storage locations are created to reserve space for extracted data associated with each hash identifier in step 570. The extracted data is stored in the corresponding storage locations in step 580. The method ends in step 590.

In an embodiment, the data sources are mutable, and updates to the data sources are propagated to virtual pages having data to related to the updates. When content is updated, the index may be notified of the change to allow the data stored in the index to accurately reflect the data provided by each data source. In an embodiment, updates are batched and distributed at specified intervals, such as daily, weekly, monthly or yearly. The crawler may scan the documents for updates based on the hash identifiers. When the data associated with a virtual page differs from the corresponding data source, the crawler may indicate that an update occurred by sending an update notification to the index. The update notification may include instructions for appending the update data to the index or removing existing data in place of the update data. Moreover, in an embodiment of the invention, the index may be refreshed on a periodic basis and updates to virtual pages included in the index may be made by adding or replacing data. In certain embodiments, the crawler may send information to the extracting component, which initiates a process for updating the virtual page with the updates. Accordingly, the virtual pages accurately reflect data associated with the data sources.

In an exemplary embodiment, an entity is an author. The criteria that define the author may include, title, year, publisher, first name and last name. The data sources are crawled by a set of crawlers to gather information about documents associated with one or more data sources, and the extracting component utilizes the criteria to extract information from the documents associated with the entity. For instance, web pages having information about authors may be processed to extract title, year, publisher, first name and last name. A hash identifier is generated to identify each entity. The hash identifier may represent a hash of the first and last name, and the hash identifier is associated with a storage location that stores the extracted information. When the extracting component extracts additional information related to the entity from other data sources, the additional information is stored at the location specified by the hash identifier. Thus, the hash identifier ensures that information associated with the author is stored in the storage location having other extracted information related to the author. Moreover, when the data sources include the first and last name of an author, any combination of the other criteria, title, publisher or year, associated with the author may be extracted from the data source and stored in the storage location associated with the author. The extracted information stored in the storage location is aggregated and structured in a markup language to generate a virtual page for the author, and the virtual page is stored in an index that responds to search queries. Accordingly, each author in the corpus of document is provided with a virtual page that provides the titles, years and publisher for publications associated with the author and each hash identifier and storage location is associated with a different author.

In summary, virtual pages aggregate data related to an entity included in one or more data sources and the virtual pages are structured in a markup language and added to an index having the data sources. The entities are defined by criteria and may include application spaces, such as shopping, books and science. The data sources are processed to extract data based on the criteria associated with the entities and hash identifiers are generated from the extracted data to represent the entities. The extracted data is aggregated and structured to generate a virtual page for each entity, and the virtual pages are stored in the index.

An alternate embodiment of the invention provides search indices that include virtual pages and data sources that provide data extracted from one or more data sources to create the virtual pages. The virtual pages aggregate data on entities included in the data sources. Updates made to data sources that are related to one or entities are propagated to virtual pages corresponding to the entity to ensure the accuracy of the virtual page. Accordingly, search queries will receive results that include virtual pages and data sources, where the results include updated data associated with the one or more entities.

The foregoing descriptions of the invention are illustrative, and modifications in configuration and implementation will occur to persons skilled in the art. For instance, while the present invention has generally been described with relation to FIGS. 1-5, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

We claim:

1. A method to aggregate data from different sources, the method comprising:
    receiving a collection of criteria that represent an entity;
    crawling a corpus of documents having data related to the entity;
    storing each document or a reference to each document in an index;
    extracting information from each document based on the collection of criteria;
    generating a hash identifier from the collection of criteria;
    creating a storage location for the hash identifier;
    storing extracted information in the corresponding storage locations based on the hash identifier; and
    incorporating the extracted information into the index, wherein incorporating the extracted information into the index further comprises:
        (1) generating a virtual page to organize the extracted information, and
        (2) storing each virtual page or a reference to each virtual page in the index, which provides search results that include the virtual pages and documents that match search terms included in a search query received by a search engine coupled to the index.

2. The method according to claim 1, wherein the collection of criteria is defined by an application owner.

3. The method according to claim 1, wherein the hash identifier represents a normalized subset of the collection of criteria.

4. The method according to claim 1, wherein two or more storage locations are reserved when the hash identifier requires large storage areas.

5. The method according to claim 4, wherein the two or more storage locations are associated with the hash identifier.

6. The method according to claim 1, further comprising:
    ranking each virtual page based on references for virtual pages or documents in the corpus of documents.

7. A method to generate virtual pages, the method comprising:
    receiving a set of criteria;
    parsing a corpus of documents based on the set of criteria;
    generating a hash identifier based on the set of criteria;
    associating the hash identifier with a storage location;
    aggregating parsed information based on the hash identifier; and
    generating virtual pages for each hash identifier, wherein the virtual pages are provided to search engines, via search results, in response to search queries having search terms that match content contained within the virtual pages.

8. The method according to claim 7, wherein the set of criteria represents an entity.

9. The method according to claim 8, wherein a subset of the set of criteria associated with the entity is hashed to generate the hash identifier for the entity.

10. The method according to claim 7, wherein the storage location is a storage device.

11. The method according to claim 7, wherein the storage location stores the parsed information.

12. The method according to claim 11, wherein the parsed information includes data extracted from the corpus documents based on the set of criteria.

13. The method according to claim 7, wherein the virtual page is a structured aggregation of the parsed information.

14. The method according to claim 13, wherein a markup language is utilized to structure the virtual page.

15. A system to generate virtual pages, the system comprising:
- a set of crawlers to gather information about a collection of documents that provides information about one or more entities,
- an extracting component to extract data from the collection of documents, wherein predefined criteria associated with the one or more entities specify what information is extracted from the documents;
- a hashing component to generate hash identifiers and associate the hash identifiers with storage locations that store information about the one more entities;
- a virtual page component to aggregate and structure the extracted information into virtual pages based on the hash identifiers; and
- an index to provide access to the virtual pages and documents that match search terms included in a search query received by a search engine coupled to the index.

16. The system according to claim 15, wherein updates to information associated with the entities are propagated from the collection of documents to the corresponding virtual pages.

17. The system according to claim 15, wherein the hashing component normalizes a subset of the extracted information.

18. The system according to claim 17, wherein the subset of the extracted information is selected from the group consisting of URLs, authors, product names and ISBNs.

19. The system according to claim 15, wherein the virtual page is structured by a markup language and ranked based on the number of references associated with virtual pages or documents from the collection of documents.

* * * * *